(12) United States Patent
Kobayashi et al.

(10) Patent No.: US 10,907,996 B2
(45) Date of Patent: Feb. 2, 2021

(54) MEASUREMENT APPARATUS FOR OUTPUTTING SIGNALS FROM AN ENCODER THAT ARE TIME-DIVISION MULTIPLEXED

(71) Applicant: Mitutoyo Corporation, Kanagawa (JP)

(72) Inventors: Hirokazu Kobayashi, Saitama (JP); Akio Kawai, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 99 days.

(21) Appl. No.: 16/240,005

(22) Filed: Jan. 4, 2019

(65) Prior Publication Data

US 2019/0219424 A1 Jul. 18, 2019

(30) Foreign Application Priority Data

Jan. 16, 2018 (JP) .................................. 2018-004922

(51) Int. Cl.
*G01D 5/347* (2006.01)
*G01D 5/244* (2006.01)

(52) U.S. Cl.
CPC ..... *G01D 5/34715* (2013.01); *G01D 5/24476* (2013.01); *G01D 5/34746* (2013.01)

(58) Field of Classification Search
CPC .......... G01D 5/34715; G01D 5/34746; G01D 5/24476; G01D 5/26; G01D 5/34; G01D 5/353

See application file for complete search history.

(56) References Cited

U.S. PATENT DOCUMENTS

| 6,232,595 | B1* | 5/2001 | Okamuro | G01D 5/24409 |
| | | | | 250/231.16 |
| 8,493,572 | B2 | 7/2013 | Milvich | |
| 2011/0273725 | A1 | 11/2011 | Milvich | |
| 2012/0217384 | A1* | 8/2012 | Nagura | G01D 5/3473 |
| | | | | 250/231.13 |

FOREIGN PATENT DOCUMENTS

JP 5976279 7/2016

* cited by examiner

*Primary Examiner* — Jennifer D Bennett
(74) *Attorney, Agent, or Firm* — Rankin, Hill & Clark LLP (57) ABSTRACT

A measurement apparatus includes: a light source that emits light; a scale that has a plurality of tracks whose patterns are different from each other, the tracks passing at least a part of lights emitted by the light source; a light receiving part that has a plurality of light receiving elements that each output an optical signal corresponding to strength of light received through the tracks; and a signal generation part that generates a serial signal in which a plurality of the optical signals are time-division multiplexed and sends the generated serial signal.

9 Claims, 7 Drawing Sheets

MEASUREMENT APPARATUS FOR OUTPUTTING SIGNALS FROM AN ENCODER THAT ARE TIME-DIVISION MULTIPLEXED

CROSS-REFERENCE TO RELATED APPLICATIONS

The present application claims priority to Japanese Patent Applications number 2018-004922, filed on Jan. 16, 2018. The contents of this application are incorporated herein by reference in their entirety.

BACKGROUND

This invention relates to a measurement apparatus containing an encoder.

An optical encoder is known as a measurement apparatus for measuring a position or an amount of displacement of an object to be measured by identifying a relationship between a position of a scale and a position of a light receiving element. Japanese patent No. 5976279 discloses an optical encoder that outputs optical signals corresponding to a strength of light received through tracks provided on a scale.

In order to identify an absolute position on the basis of optical signals acquired through the tracks, the optical signals must be transmitted to a processing apparatus for calculating the absolute position on the basis of the optical signals. Transmission lines corresponding to the number of optical signals are required to transmit the optical signals. As a result, there are problems such that the area of the transmission lines formed on a printed-circuit board or the size of cables used for the transmission lines must be large.

SUMMARY

This invention focuses on these points, and an object of the present invention is to reduce the number of transmission lines in a measurement apparatus for measuring an absolute position on the basis of optical signals.

A measurement apparatus according to the present invention includes: a light emitting part that emits light; a scale that includes a plurality of tracks whose patterns are different from each other, the plurality of tracks passing at least a part of lights emitted by the light emitting part; a light receiving part that includes a plurality of light receiving elements that each output an optical signal corresponding to intensity of light received through the plurality of tracks; and a signal generation part that generates a serial signal in which a plurality of the optical signals are time-division multiplexed and sends the generated serial signal.

DETAILED DESCRIPTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

<Configuration of a Measurement Apparatus S>

Figure 1:
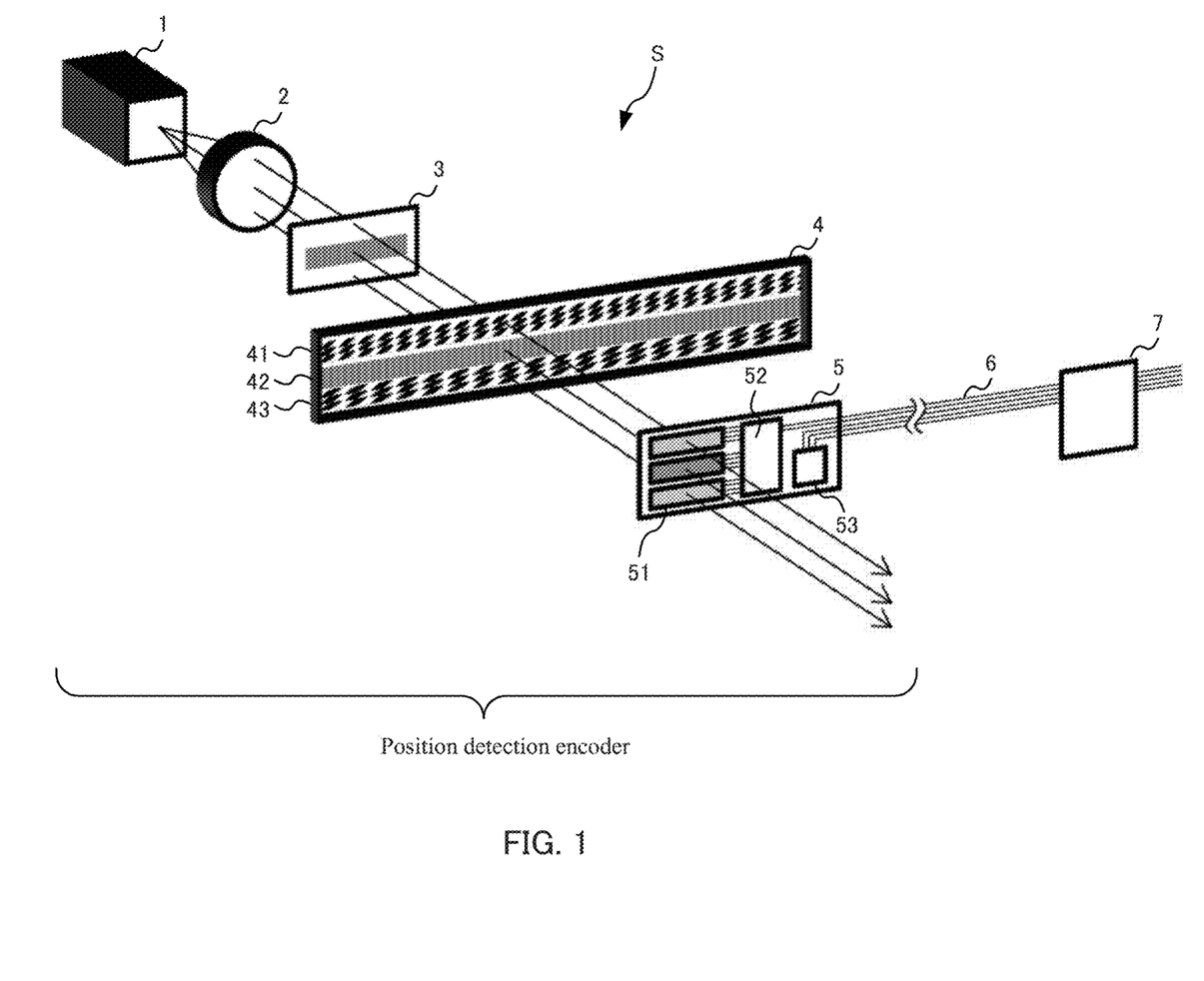
FIG. 1 shows a schematic configuration of a measurement apparatus.

FIG. 1 shows a schematic configuration of a measurement apparatus S. The measurement apparatus S is an apparatus for measuring a position of an object to be measured by using an incremental measurement method and an absolute measurement method. The incremental measurement method is a method of measuring a position by continuing to identify a relative position of a scale relative to an initial position that is set after an operation is initiated. The absolute measurement method is a method of measuring a position by identifying an absolute position of the scale relative to a measurement reference position that is predetermined before the operation is initiated.

The measurement apparatus S includes a light source 1, a lens 2, an optical grid 3, a scale 4, a light-receiving unit 5, a cable 6, and a processing apparatus 7. The light source 1, the lens 2, the optical grid 3, the scale 4, and the light receiving unit 5 function as a position detection encoder. The cable 6 functions as a transmission line for transmitting a serial signal transmitted by the light receiving unit 5. The processing apparatus 7 transmits the serial signal containing control data for controlling the light receiving unit 5 through the cable 6 serving as the transmission line. Further, the processing apparatus 7 functions as a position identification part for identifying a positional relationship between the scale 4 and the light receiving unit 5.

The light source 1 is a device that functions as a light emitting part for emitting a light, for example, a light emitting diode (LED). The light source 1 is provided with an orientation for emitting a light toward the lens 2.

The lens 2 changes an orientation of the light input from the light source 1 so that the light emitted by the light source 1 illuminates a predetermined region of the scale 4. Specifically, the lens 2 transforms the light emitted by the light source 1 to be parallel light rays so that the light emitted by the light source 1 reaches the light receiving unit 5 through tracks formed on the scale 4. The light transformed into the parallel light rays by the lens 2 enters the optical grid 3.

The optical grid 3 uniformizes illuminance of the light entering through the lens 2. Specifically, the optical grid 3 uniformizes the distribution of the illuminance of the parallel light rays entering via the lens 2 in the region of the light receiving unit 5 where a light is detected. It should be noted that the measurement apparatus S does not need the optical grid 3 when the distribution of illuminance of the parallel light rays emitted from the lens 2 are uniform enough.

The scale 4 is a panel having tracks whose patterns are different from each other and pass at least a portion of the light emitted by the light source 1. The scale 4 has the first track 41, the second track 42, and the third track 43, in each of which a region that transmits a light and a region that does not transmit a light are aligned in a sequential order. The scale 4 transmits a part of the light entering through the optical grid 3 at the first track 41, the second track 42, and the third track 43 and generates transmitted lights whose intensities are different according to a position in the light receiving unit 5.

The first track 41 and the third track 43 are an absolute scale pattern (hereinafter, ABS pattern) that is used for identifying the position of the object to be measured with the absolute measurement method. The period of the pattern of the first track 41 is different from the period of the pattern of the third track 43.

The second track 42 is an incremental scale pattern (hereinafter, INC pattern) that is used for identifying the position of the object to be measured with the incremental measurement method. The period of the pattern of the second track 42 is shorter than the period of the pattern of the first track 41 and the period of the pattern of the third track 43.

The light receiving unit 5 includes a light receiving part 51, a signal generation part 52, and a communication part 53. The light receiving part 51 outputs a plurality of the first optical signals whose phases are different from each other, on the basis of the light transmitted through the first track 41. The light receiving part 51 outputs a plurality of the second optical signals whose phases are different from each other, on the basis of the light transmitted through the second track 42. The light receiving part 51 outputs a plurality of the third optical signals whose phases are different from each other, on the basis of the light transmitted through the third track 43.

The light receiving part 51 has a plurality of light receiving elements that each output the light signals corresponding to the strength of light respectively received through the first track 41, the second track 42, and the third track 43 in order to output a plurality of light signals with different phases. The plurality of light receiving elements are, for example, photoelectric elements that transform light into current.

The plurality of the first light receiving elements that receive light through the first track 41 are aligned in a longitude direction of the scale 4 with a density corresponding to four elements in a period of the ABS pattern formed on the first track 41. The plurality of the second light receiving elements that receive light through the second track 42 are aligned in a longitude direction of the scale 4 with a density corresponding to four elements in a period of the INC pattern formed on the second track 42. The plurality of the third light receiving elements that receive light through the third track 43 are aligned in a longitude direction of the scale 4 with a density corresponding to four elements in a period of the ABS pattern formed on the third track 43.

Since four light receiving elements are aligned in a period of the pattern formed on the scale 4, the four light receiving elements output four optical signals whose phases differ by 90 degrees from each other. In this specification, the four optical signals with different phases are referred to as an A signal, an AB signal, a B signal, and a BB signal. The phase of the B signal is 90 degrees delayed compared to the phase of the A signal. The phase of the AB signal is 180 degrees delayed compared to the phase of the A signal. The phase of the BB signal is 270 degrees delayed compared to the phase of the A signal.

The light receiving part 51 generates the A signals, the AB signals, the B signals, and the BB signals for each of the first track 41, the second track 42, and the third track 43. In other words, the light receiving part 51 generates twelve optical signals on the basis of the light received through the first track 41, the second track 42, and the third track 43 and inputs the generated optical signals to the signal generation part 52.

The signal generation part 52 generates a serial signal by time-division multiplexing the plurality of optical signals input from the light receiving part 51. The signal generation part 52 sends the generated serial signal to the processing apparatus 7 through the cable 6. The details of the exemplary configuration of the signal generation part 52 will be described below.

The communication part 53 sends and receives a clock and the control data to and from the processing apparatus 7 through the cable 6. The communication part 53 is a device for communication corresponding to, for example, the serial peripheral interface (SPI), and receives a clock SK and input data DI and sends output data DO to the processing apparatus 7. Hereinafter, the details of the signal generation part 52 will be explained.

(The First Embodiment of the Signal Generation Part 52)

Figure 2:
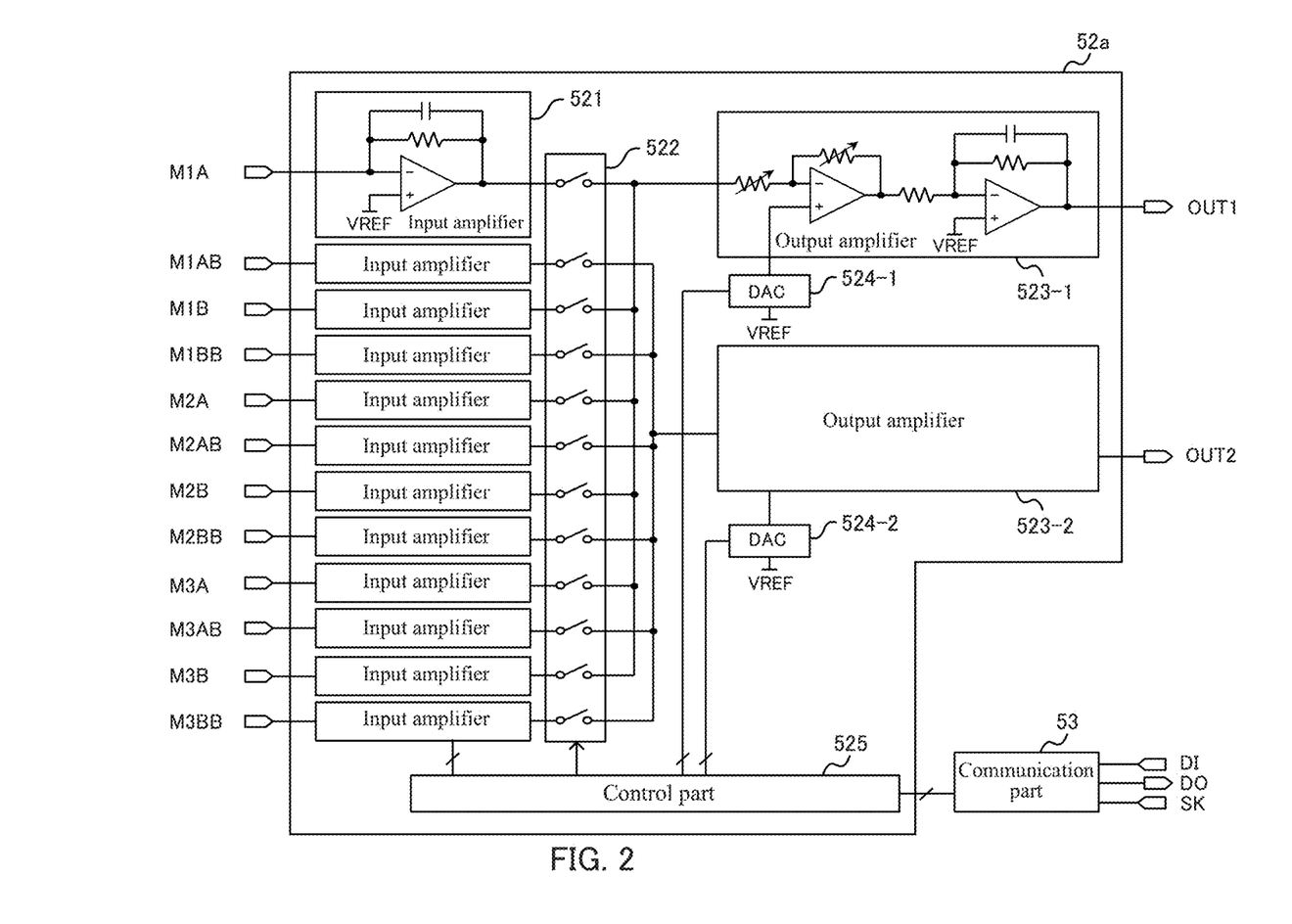
FIG. 2 shows a configuration of the signal generation part according to the first embodiment.

FIG. 2 shows a configuration of the signal generation part 52a according to the first embodiment. The signal generation part 52a includes input amplifiers 521, a signal selection part 522, output amplifiers 523 (523-1, 523-2), DA converters 524 (524-1, 524-2), and a control part 525. The signal generation part 52a is an integrated circuit in which, for example, digital circuits and analog circuits are mixed.

The input amplifier 521 transforms the photocurrent signal input from the light receiving part 51 into a voltage signal. In an example as shown in FIG. 2, the signal generation part 52a has twelve input amplifiers 521. It should be noted that the signals from M1A to M1BB in FIG. 2 are the A signal, the AB signal, the B signal, and the BB signal corresponding to the first track 41. Similarly, the signals from M2A to M2BB and the signals from M3A to M3BB are the A signal, the AB signal, the B signal, and the BB signal corresponding to each of the second track 42 and the third track 43.

The signal selection part 522 selects one optical signal from among the plurality of optical signals and outputs the selected signal. Specifically, the signal selection part 522 has a plurality of switches each having one terminal connected to an output terminal of a respective one of the plurality of input amplifiers 521, and another terminal connected to an input terminal of either the output amplifier 523-1 or the output amplifier 523-2. In the example as shown in FIG. 2, the other terminals of the switches corresponding to the A signal and the B signal are connected to the output amplifier 523-1, and the other terminals of the switches corresponding to the AB signal and the BB signal are connected to the output amplifier 523-2.

The signal selection part 522 may turn on one of the switches, the other terminals of which are connected to the same output amplifiers 523, and may turn off the other switches on the basis of a control of the control part 525. By doing this, the signal selection part 522 can input one optical signal out of the A signals and the B signals to the output amplifier 523-1 and can input one optical signal out of the AB signals and the BB signals to the output amplifier 523-2.

The signal selection part 522 selects a switch to be turned on according to a selection signal input from the control part 525. The selection signal is data whose bit width (6 bits, for example) corresponds to the number of switches that the signal selection part 522 has. The signal selection part 522 turns on the switch for inputting an M1A signal, an M1B signal, an M2A signal, an M2B signal, an M3A signal, and an M3B signal to the output amplifier 523-1 when the lower 3 bits of the selection signal are, for example, 000, 001, 010, 011, 100, and 101, respectively. Further, the signal selection part 522 turns on the switch for inputting an M1AB signal, an M1BB signal, an M2AB signal, an M2BB signal, an M3AB signal, and an M3BB signal to the output amplifier 523-1 when the upper 3 bits of the selection signal are, for example, 000, 001, 010, 011, 100, and 101, respectively.

The output amplifiers 523 each function as a wave adjusting part that adjusts waves of optical signals input through the signal selection part 522. Specifically, the output amplifiers 523 each output an optical signal to the cable 6 after adjusting the input optical signal by changing the offset of the input optical signal or amplifying the input optical signal. Each output amplifier 523 may change its amplification rate in multiple stages on the basis of the control of the control part 525 that received the control data from the processing apparatus 7. The output amplifier 523-1 outputs the amplified optical signal from the OUT1 terminal, and the output amplifier 523-2 outputs the amplified optical signal from the OUT2 terminal.

The DA converters 524 each generate an offset-cancelling voltage for an amplifier of the output amplifier 523 based on the control of the control part 525. The DA converters 524, for example, each output the offset-cancelling voltage for cancelling an offset element of the amplifier. The DA converter 524-1 generates an offset-cancelling voltage input to the output amplifier 523-1, and the DA converter 524-2 generates an offset-cancelling voltage input to the output amplifier 523-2.

The control part 525 includes a central processing unit (CPU), a read only memory (ROM), and a random access memory (RAM). By executing a program stored in the ROM, the control part 525 controls each part of the signal generation part 52 on the basis of control data received from the processing apparatus 7 through the communication part 53. The control part 525, for example, adjusts the offset of the optical signals or adjusts the amplitude of the optical signals by controlling the output amplifiers 523 and the DA converters 524 on the basis of the control data.

Further, the control part 525 has a circuit that functions as a selection signal generation part that generates a selection signal for selecting one optical signal that the signal selection part 522 inputs to the output amplifier 523-1 or the output amplifier 523-2. The control part 525 generates the selection signal in synchronization with the clock SK received from the processing apparatus 7 through the cable 6.

The control part 525 generates the selection signal that changes with a period shorter than that of the optical signals input from the light receiving part 51. Here, the period of the optical signal corresponding to the second track 42 generated when the scale 4 moves at the highest speed specified by a specification of the measurement apparatus S is assumed to be T1. Also, the number of multiplexed optical signals, in other words, the number of the optical signals input to the output amplifier 523-1 or the output amplifier 523-2, is assumed to be M. In this case, the time interval T2 of changing the selection signal generated by the control part 525, is set to satisfy the condition $T2 \leq T1/2/M$.

If T2 is set to satisfy the above condition, each of the optical signals can be sampled at a frequency that is two times or more of the frequency of each optical signal (that is to say, at a frequency that is larger than the Nyquist frequency), and is output to the processing apparatus 7 as a time-division multiplexed serial signal. Accordingly, the processing apparatus 7 can regenerate the optical signal that the light receiving part 51 output on the basis of the optical signal contained in the serial signal.

Figure 3:
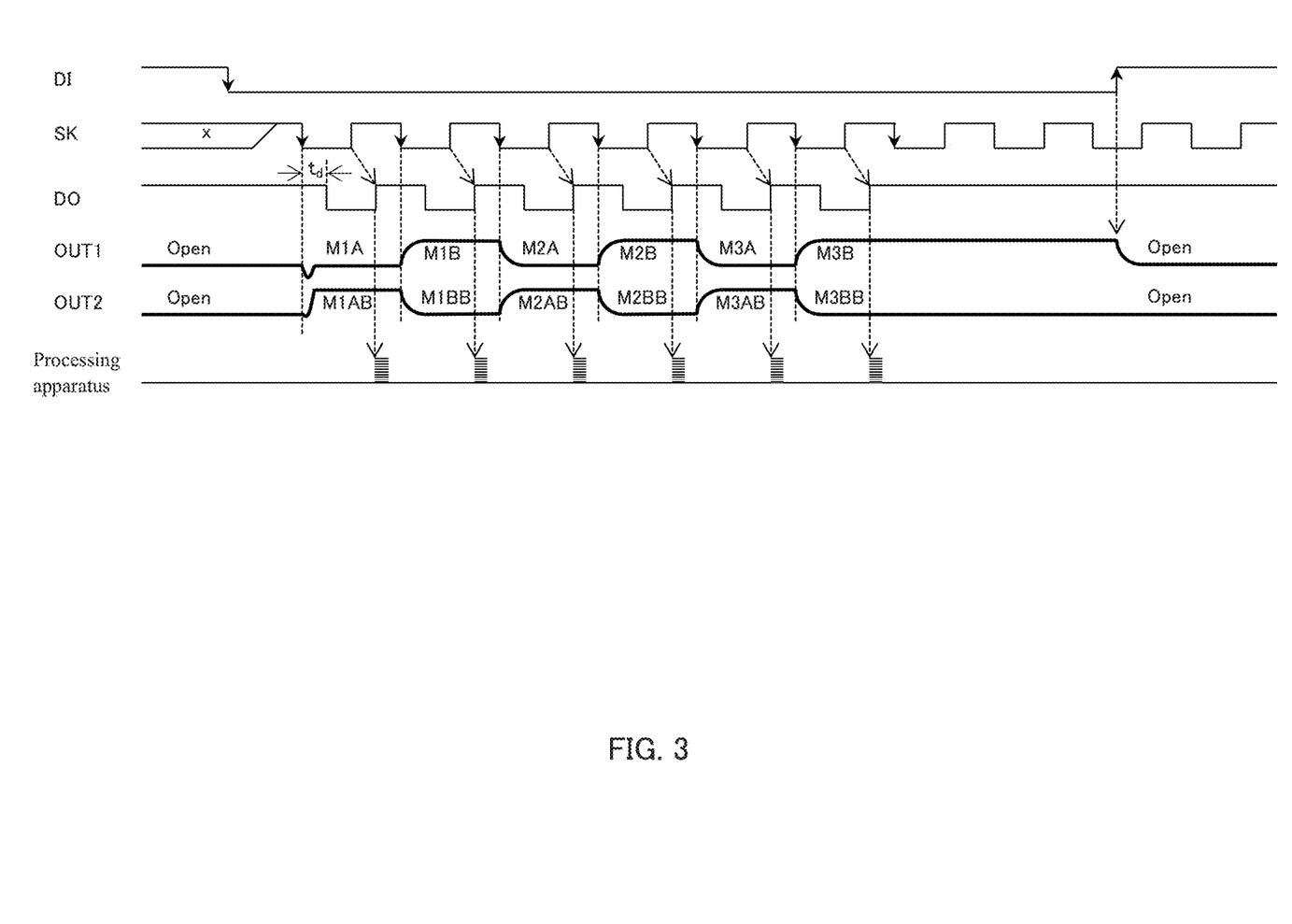
FIG. 3 shows a relationship between the timings of a serial signal and a clock that the signal generation part outputs.

FIG. 3 shows a relationship between the timings of the serial signal and the clock SK that the signal generation part 52a outputs. The input data DI is data output by the processing apparatus 7, and the input data DI shows a time period when the signal generation part 52a can send the serial signal. The control part 525 also functions as a timing signal generation part that generates a timing signal for specifying a timing for the processing apparatus 7 to acquire the optical signals contained in the serial signal. Specifically, upon detecting that the input data DI is at low level, the control part 525 generates, as the timing signal which the processing apparatus 7 uses to acquire the optical signals, output data DO that is generated by adding a delay of time $t_d$ to the clock SK, and causes the communication part 53 to output the generated output data DO.

As shown in FIG. 3, the OUT1 signal, which is the first serial signal output from the OUT1 terminal, sequentially changes to the M1A signal, the M1B signal, the M2A signal, the M2B signal, the M3A signal, and the M3B signal synchronized to the falling timing of the clock SK by the value of the selection signal changing synchronized to the falling timing of the clock SK. Similarly, the OUT2 signal, which is the second serial signal output from the OUT2 terminal, sequentially changes to the M1 AB signal, the M1BB signal, the M2AB signal, the M2BB signal, the M3AB signal, and the M3BB signal. The OUT1 signal is a signal in which optical signals with the first phase are time-division multiplexed, and the OUT2 signal is a signal in which optical signals with the second phase whose difference from the first phase is 180 degrees are time-division multiplexed. Thus, by simultaneously sending optical signals whose phases differ by 180 degrees from each other, it is easy for a receiver side to remove noise with the same phase.

The processing apparatus 7 identifies a positional relationship between the scale 4 and the light receiving part 51 on the basis of the optical signals extracted from the serial signal received through a transmission line such as the cable 6. The processing apparatus 7 acquires the optical signal contained in the OUT1 signal received through the cable 6 at the rising timing of the output data DO. The processing apparatus 7 acquires the OUT1 signal and the OUT2 signal, for example, by executing interrupt processing at the rising timing of the output data DO. Since the output data DO is delayed from the clock SK by a time $t_d$, the output data DO rises at timings when the OUT1 signal and the OUT2 signal do not change. Accordingly, the processing apparatus 7 can acquire the OUT1 signal and the OUT2 signal at timings when the values of the OUT1 signal and the OUT2 signal become stable, and so the probability that a data error occurs is low.

The processing apparatus 7 identifies a position in one period of the ABS pattern formed on the first track 41 on the basis of the M1A signal, the M1B signal, the M1 AB signal, and the M1BB signal that are contained in the OUT1 signal and the OUT2 signal. Further, the processing apparatus 7 identifies a position in one period of the ABS pattern formed on the third track 43 on the basis of the M3A signal, the M3B signal, the M3AB signal, and the M3BB signal that are contained in the OUT1 signal and the OUT2 signal.

Then, the processing apparatus 7 identifies an absolute position of the light receiving unit 5 relative to the scale 4 by synthesizing phases on the basis of a combination of the identified positions in one period of the ABS pattern formed on the first track 41 and in one period of the ABS pattern formed on the third track 43. The processing apparatus 7 may further identify a relative position relative to a reference position on the basis of the M2A signal, the M2B signal, the M2AB signal, and the M2BB signal contained in the OUT1 signal and the OUT2 signal.

(Operation Modes of the Communication Part 53)

The signal generation part 52 adjusts the offset and the amplitude of the optical signal that is sent as a serial signal through the communication part 53 on the basis of the control data received from the processing apparatus 7 through the communication part 53. The communication part 53 acquires the input data DI containing the control data at timings synchronized to the clock SK sent from the processing apparatus 7. Further, the communication part 53 sends the output data DO generated by the control part 525 at timings synchronized to the clock SK.

The control part 525 may receive the control data and send the output data DO simultaneously, but the control part 525 may switch between an operation mode of receiving the control data and an operation mode of sending the output data DO on the basis of instructions from another external device. If the control part 525 thus switches the operation mode, the load during sending the output data DO is reduced, and it becomes easier for the control part 525 to execute processing by software.

As described above, the signal generation part 52a generates the OUT1 signal by time-division multiplexing the M1A signal, the M1B signal, the M2A signal, the M2B signal, the M3A signal, and the M3B signal out of the twelve optical signals input from the light receiving part 51. Further, the signal generation part 52a generates the OUT2 signal by time-division multiplexing the M1AB signal, the M1BB signal, the M2AB signal, the M2BB signal, the M3AB signal, and the M3BB signal. By doing this, the light receiving unit 5 can send twelve optical signals to the processing apparatus 7 using two transmission lines, and so the diameter of the cable 6 can be reduced even when the light receiving unit 5 and the processing apparatus 7 are connected by the cable 6.

(The Second Embodiment of the Signal Generation Part 52)

Figure 4:
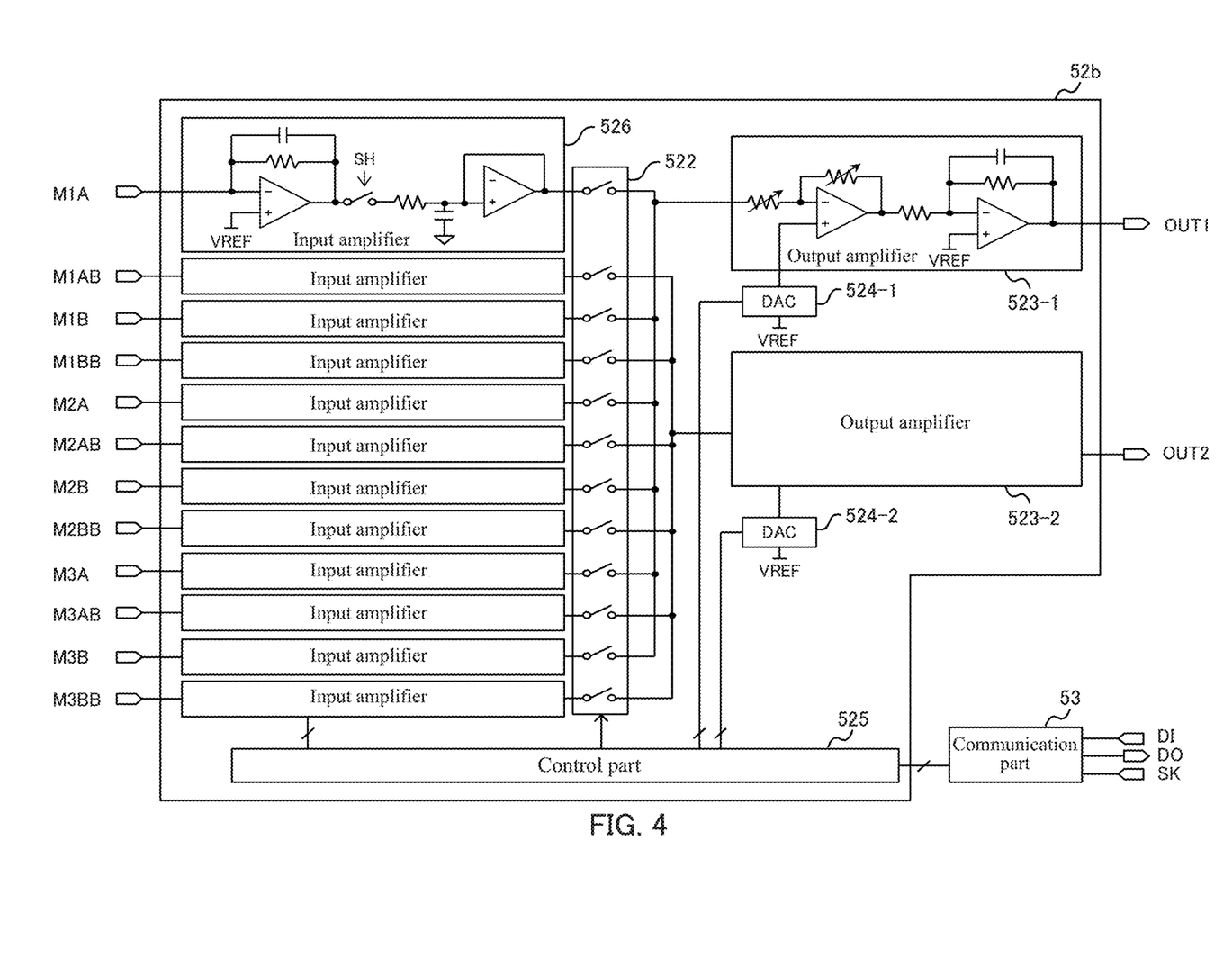
FIG. 4 shows a configuration of a signal generation part according to the second embodiment.
Figure 5:
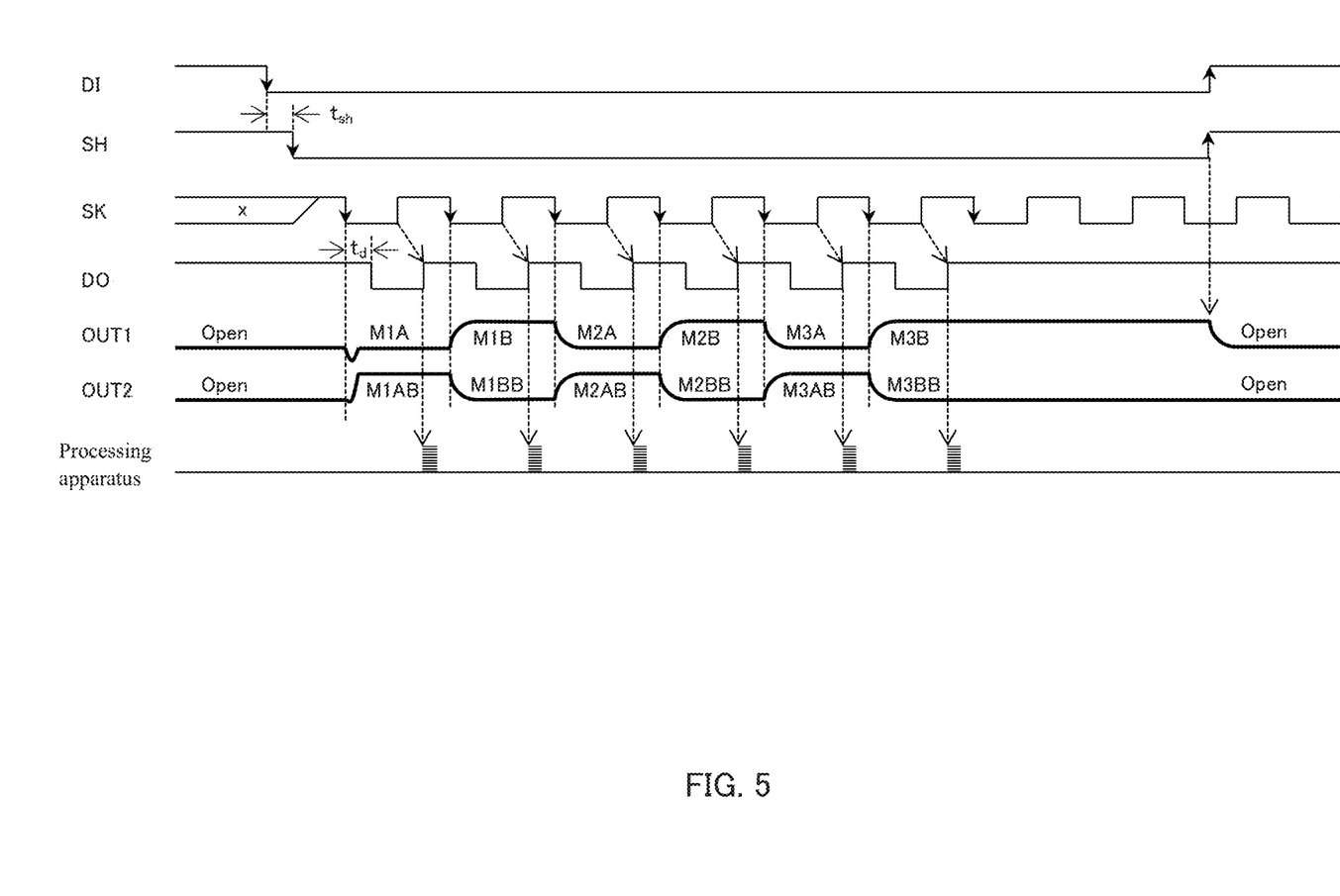
FIG. 5 shows a relationship of the timings of a serial signal and a clock that the signal generation part outputs.

FIG. 4 shows a configuration of the signal generation part 52b according to the second embodiment. FIG. 5 shows a relationship of the timings of the serial signal and the clock SK that signal generation part 52b outputs.

The signal generation part 52b is different from the signal generation part 52a in that the signal generation part 52b has input amplifiers 526 instead of the input amplifiers 521 shown in FIG. 2, and the signal generation part 52b is the same as the signal generation part 52a in all other ways. The input amplifiers 526 have, in a rear stage of the input amplifiers 521, sample and hold circuits that function as level holding parts for holding the levels of the optical signals for a predetermined time. The input amplifiers 526 capture the levels of the optical signals input from the light receiving part 51 at a predetermined timing and continue to output the captured optical signals to the signal selection part 522 while holding the captured levels. The signal selection part 522 inputs the held levels of the optical signals output from the input amplifiers 526 to the output amplifier 523-1 and the output amplifier 523-2 in a sequential manner.

In an example shown in FIG. 5, the control part 525 changes the SH signal to a low level when a delay time $t_{sh}$ passes after the falling timing of the input data DI, and causes the input amplifiers 526 to capture the levels of the optical signals. The OUT1 terminal outputs a serial signal in which the M1A signal, the M1B signal, the M2A signal, the M2B signal, the M3A signal, and the M3B signal at the timing when the SH signal changes to a low level are time-division multiplexed. Further, the OUT2 terminal outputs a serial signal in which the M1 AB signal, the M1BB signal, the M2AB signal, the M2BB signal, the M3AB signal, and the M3BB signal at the timing when the SH signal changes to a low level are time-division multiplexed.

Thus, the signal generation part 52b simultaneously samples and holds the optical signals, and sends the values obtained by holding the optical signals in a time-division multiplexed manner. By doing this, the period of time when the light source 1 is turned on can be shorten, and so the consumed current can be reduced. Further, values of optical signals at the same timing can be sent.

Furthermore, the processing apparatus 7 can identify the positional relationship between the scale 4 and the light receiving unit 5 with a high precision even if the processing apparatus 7 does not regenerate waveforms of the optical signals on the basis of the values of the optical signals contained in the received serial signal and uses the values of the optical signals as they are. In this case, the processing apparatus 7 can acquire the values of the optical signals of the same timing even if the control part 525 switches the signal selection part 522 at a time interval that is longer than half of the time period of the optical signals. As a result, the processing apparatus 7 can identify the positional relationship between the scale 4 and the light receiving unit 5 even when the scale 4 moves fast.

(The Third Embodiment of the Signal Generation Part 52)

Figure 6:
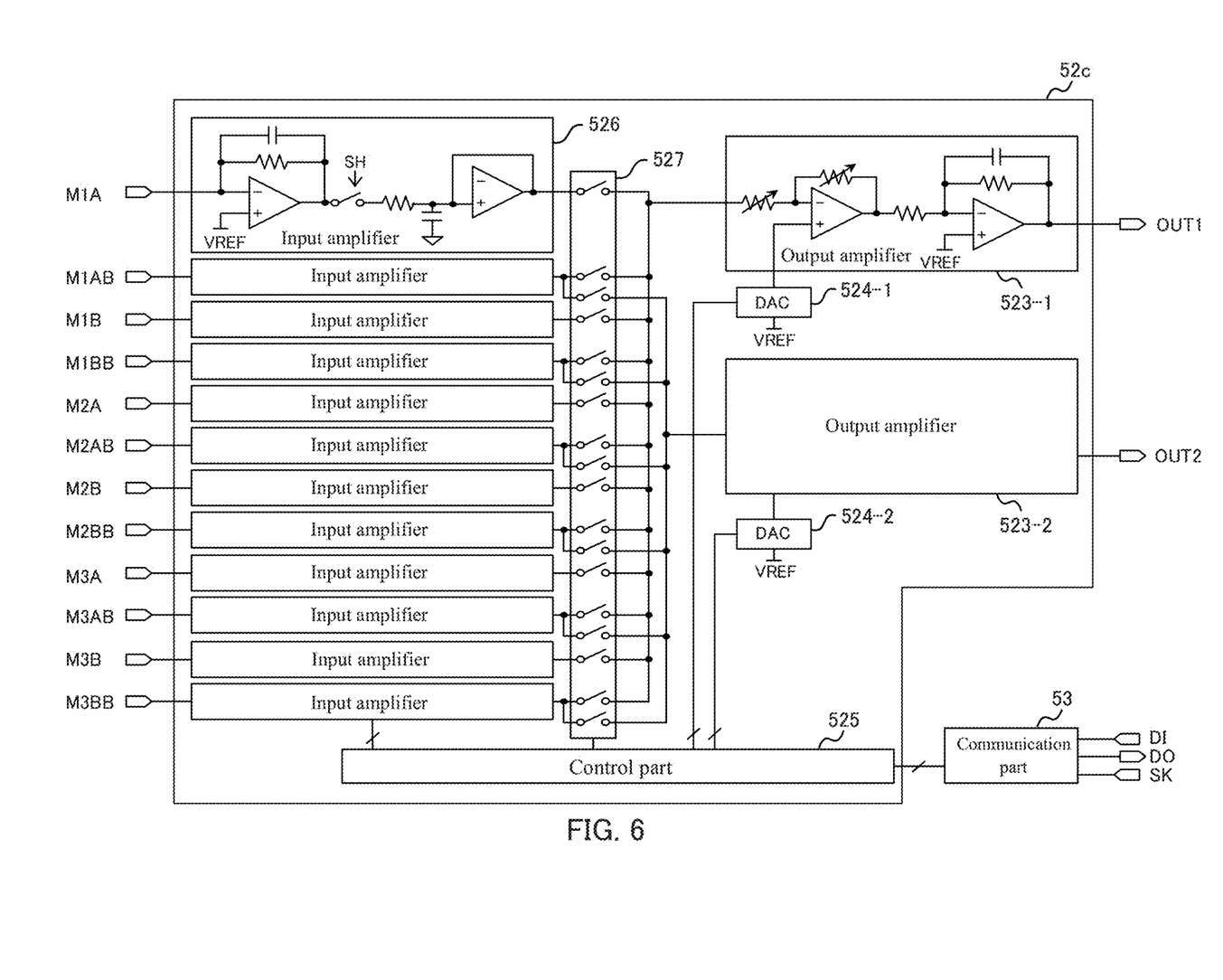
FIG. 6 shows a configuration of a signal generation part according to the third embodiment.
Figure 7:
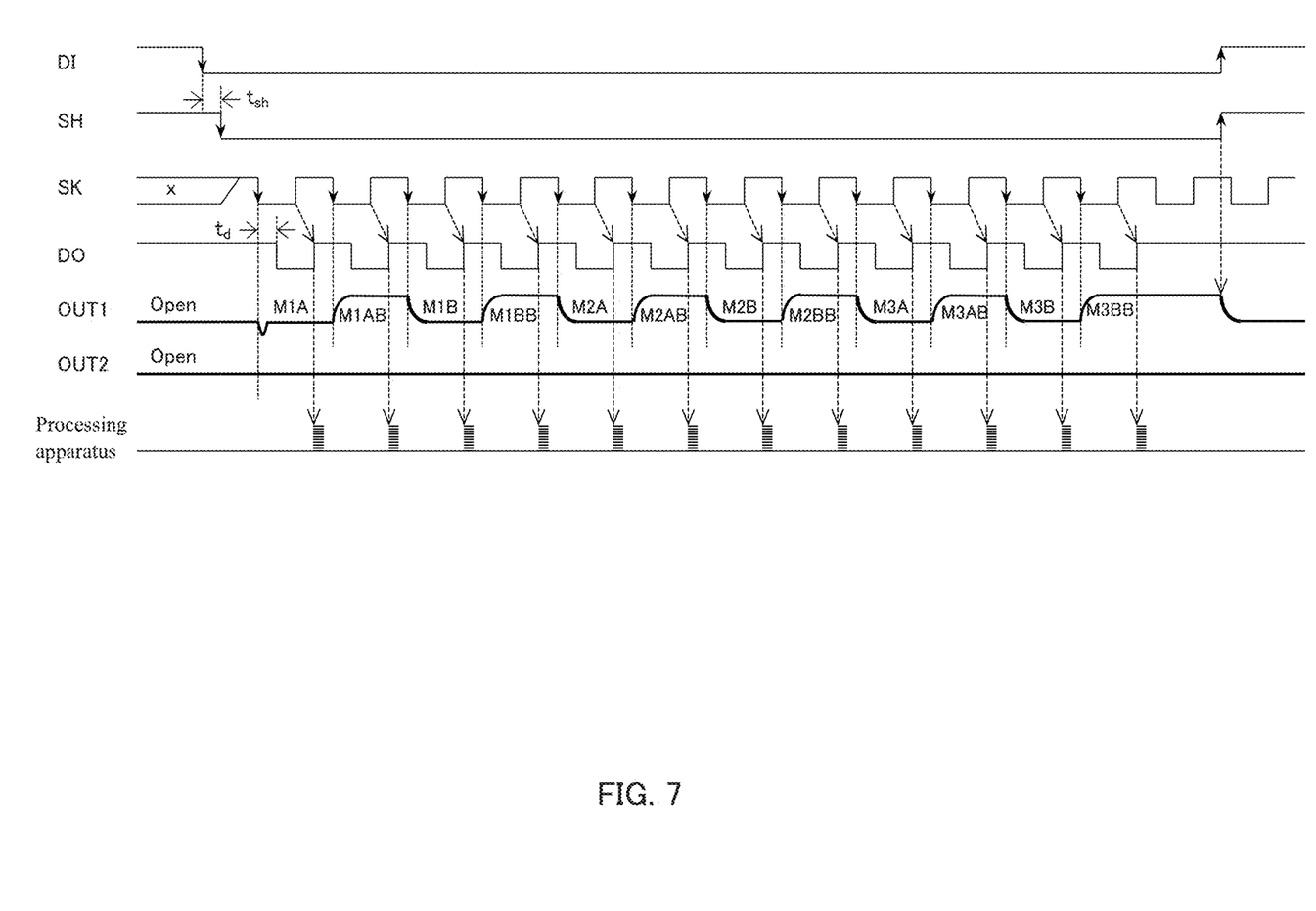
FIG. 7 shows the relationship of the timings of a serial signal and a clock that the signal generation part outputs.

FIG. 6 shows a configuration of the signal generation part 52c according to the third embodiment. FIG. 7 shows the relationship of the timings of the serial signal and the clock SK that the signal generation part 52c outputs.

The signal generation part 52c is different from the signal generation part 52b in that the signal generation part 52c has a signal selection part 527 instead of the signal selection part 522 shown in FIG. 4, and the signal generation part 52c is the same as the signal generation part 52b in all other ways. The signal selection part 527 has switches corresponding to all the optical signals so that all the optical signals input to the signal generation part 52 can be input to the output amplifier 523-1. Since the signal selection part 527 has this configuration, as FIG. 7 shows, the signal generation part 52 can output the serial signal in which the M1A signal, the M1B signal, the M2A signal, the M2B signal, the M3A signal, the M3B signal, M1 AB signal, the M1BB signal, the M2AB signal, the M2BB signal, the M3AB signal, and the M3BB signal are time-division multiplexed from the OUT1 terminal. As a result, the number of cables 6 that connects the light receiving unit 5 and the processing apparatus 7 can be reduced, or the area of lines on the printed-circuit board can be reduced.

Further, the signal selection part 527 has a switch for inputting the M1A signal, the M1B signal, the M2A signal, the M2B signal, the M3A signal, and the M3B signal to the output amplifier 523-2. The signal selection part 527 can change whether the switch is used or not under the control of the control part 525. That is, the signal generation part 52 can switch between (i) a mode of generating one serial signal by time-division multiplexing all the optical signals as shown in FIG. 7 and (ii) a mode of generating two serial signals by dividing optical signals input to the signal generation part 52 into two groups and time-division multiplexing each group as shown in FIG. 5. Since the signal generation part 52 has this configuration, a user of the signal generation part 52 can select an optimum mode according to the number of usable cables 6, the minimum period of the optical signals, or the like.

Variation Example 1

The signal generation part 52a according to the first embodiment that is shown in FIG. 2 may include, instead of the signal selection part 522, the signal selection part 527 of the signal generation part 52c according to the third embodiment that is shown in FIG. 6. In this case, the signal generation part 52a can switch between the mode of generating one serial signal and the mode of dividing optical signals into two groups to generate two serial signals by time-division multiplexing the optical signals in each group.

Variation Example 2

The signal generation part 52 may generate two serial signals that contain optical signals with combinations different from the two serial signals generated by the signal generation part 52a of the first embodiment and the signal generation part 52b of the second embodiment. The signal generation part 52, for example, may generate three serial signals in which four optical signals corresponding to one track are time-division multiplexed and send the three serial signals to the processing apparatus 7.

Variation Example 3

In the above explanations, an example in which the measurement apparatus S has both the incremental measurement method and the absolute measurement method was illustrated, but the measurement apparatus S may have either the incremental measurement method or the absolute measurement method.

Variation Example 4

In the above explanations, an example in which the transmission line between the light receiving unit 5 and the processing apparatus 7 as a position identification part is the cable 6 was illustrated, but the transmission line is not limited to the cable 6. The light receiving unit 5 and the processing apparatus 7 may be provided on the same printed-circuit board, and conductive patterns formed on the printed-circuit board may function as the transmission line.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. A measurement apparatus, comprising:
a light emitting part that emits light;
a scale that includes a plurality of tracks whose patterns are different from each other, the plurality of tracks passing at least a part of lights emitted by the light emitting part;
a light receiving part that includes a plurality of light receiving elements that each output an optical signal corresponding to intensity of light received through the plurality of tracks;
a signal generation part that generates a serial signal in which a plurality of the optical signals are time-division multiplexed and sends the generated serial signal;
a transmission line that transmits the serial signal generated by the signal generation part; and
a position identification part that identifies a positional relationship between the scale and the light receiving part on the basis of the plurality of optical signals extracted from the serial signal received through the transmission line, wherein
the signal generation part includes:
a selection part that selects one optical signal from among the plurality of the optical signals; and
a selection signal generation part that generates a selection signal that changes in a period that is shorter than a period of the plurality of the optical signals for the selection part to select the one optical signal.

2. The measurement apparatus according to claim 1, wherein the signal generation part includes a level holding part that holds levels of the plurality of light signals for a predetermined time, and generates the serial signal by time-division multiplexing the plurality of optical signals whose levels have been held by the level holding part.

3. The measurement apparatus according to claim 1, wherein the signal generation part sends a first serial signal in which a plurality of optical signals with a first phase are time-division multiplexed and a second serial signal in which a plurality of optical signals with a second phase that is different from the first phase by 180 degrees are time-division multiplexed.

4. The measurement apparatus according to claim 1, wherein the signal generation part includes a wave adjusting part that adjusts a waveform of the serial signal.

5. The measurement apparatus according to claim 1, wherein the selection signal generation part generates the selection signal that changes with a time interval T2 which satisfies a condition T2≤T1/2/M, where T1 is a period of the optical signal being generated when the scale moves at a highest speed, and M is the number of multiplexed optical signals.

6. The measurement apparatus according to claim 1, wherein the signal generation part switches between a mode of receiving the serial signal and a mode of receiving output data from another external device.

7. A The measurement apparatus, comprising:
a light emitting part that emits light;
a scale that includes a plurality of tracks whose patterns are different from each other, the plurality of tracks passing at least a part of lights emitted by the light emitting part;
a light receiving part that includes a plurality of light receiving elements that each output an optical signal corresponding to intensity of light received through the plurality of tracks;
a signal generation part that generates a serial signal in which a plurality of the optical signals are time-division multiplexed and sends the generated serial signal;
a transmission line that transmits the serial signal generated by the signal generation part; and
a position identification part that identifies a positional relationship between the scale and the light receiving part on the basis of the plurality of optical signals extracted from the serial signal received through the transmission line, wherein
the signal generation part includes:
a selection part that selects one optical signal from among the plurality of the optical signals; and a selection signal generation part that generates a selection signal, synchronized to a clock received from the position identification part through the transmission line, for the selection part to select the one optical signal.

8. The measurement apparatus according to claim 7, wherein the signal generation part includes a timing signal generation part that generates a timing signal that specifies timing for the position identification part to acquire the plurality of optical signals included in the serial signal.

9. A measurement apparatus, comprising:
- a light emitting part that emits light;
- a scale that includes a plurality of tracks whose patterns are different from each other, the plurality of tracks passing at least a part of lights emitted by the light emitting part;
- a light receiving part that includes a plurality of light receiving elements that each output an optical signal corresponding to intensity of light received through the plurality of tracks; and
- a signal generation part that generates a serial signal in which a plurality of the optical signals are time-division multiplexed and sends the generated serial signal, wherein
- the signal generation part switches between (i) a mode of generating one serial signal by time-division multiplexing all the optical signals and (ii) a mode of generating two serial signals by dividing the optical signals into two groups and time-division multiplexing each group.

* * * * *